United States Patent
Larsson

(10) Patent No.: US 7,948,911 B2
(45) Date of Patent: May 24, 2011

(54) IMPLICIT SIGNALING FOR LINK ADAPTATION

(75) Inventor: Peter Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 614 days.

(21) Appl. No.: 12/092,814

(22) PCT Filed: Nov. 7, 2005

(86) PCT No.: PCT/SE2005/001673
§ 371 (c)(1),
(2), (4) Date: May 6, 2008

(87) PCT Pub. No.: WO2007/053072
PCT Pub. Date: May 10, 2007

(65) Prior Publication Data
US 2008/0298306 A1    Dec. 4, 2008

(51) Int. Cl.
*G01R 31/08*      (2006.01)
*H04L 12/413*    (2006.01)
*H04J 3/16*        (2006.01)

(52) U.S. Cl. .................. 370/252; 370/445; 370/468

(58) Field of Classification Search .......... None
See application file for complete search history.

(56) References Cited

U.S. PATENT DOCUMENTS

| | | | |
|---|---|---|---|
| 7,821,976 B2 * | 10/2010 | Kim et al. | 370/311 |
| 2005/0169232 A1 * | 8/2005 | Sakoda et al. | 370/347 |
| 2007/0076754 A1 * | 4/2007 | Krishnaswamy | 370/468 |

\* cited by examiner

*Primary Examiner* — Nittaya Juntima

(57) ABSTRACT

Briefly, the invention concerns the issue of supporting link adaptation in a wireless network, and basically involves implicit signaling for link adaptation based on transfer of transmit duration information. More particularly, a designated originating node sends (S1) a first message, including an indication of a current transmit duration for transfer of a predetermined amount of information, to at least a designated receiving node. The current transmit duration corresponds to a currently assumed data link rate. The designated receiving node selects (S2) a desired data link rate for subsequent communication from the originating node, and then determines (S3) an updated transmit duration according to the selected data link rate. The receiving node sends (S4) a second message, including an indication of the updated transmit duration, to at least the designated originating node, and the originating node then determines (S5) an updated data link rate in response to the updated transmit duration. In particular, the transmit duration information may preferably be transferred in the existing duration field in the frames of contention-based network protocols with support for virtual carrier sensing.

31 Claims, 13 Drawing Sheets

IMPLICIT SIGNALING FOR LINK ADAPTATION

TECHNICAL FIELD OF THE INVENTION

The present invention generally relates to wireless communication networks, and more particularly to the issue of supporting link adaptation in such networks.

BACKGROUND OF THE INVENTION

In wired communications, the conditions of the transmission medium do not generally change. However, in wireless communication, the conditions of the communication medium, i.e. the communication channel, may vary significantly over time as well as space.

Link adaptation allows transmission parameters used for communication to be adapted to the channel conditions of the link in order to optimally exploit the potential of the communication channel, usually to provide high data transfer rates along with low bit error rates.

For example, in a wireless communication system, such as a cellular or equivalent system, employing link adaptation for the downlink, the modulation and coding scheme and/or other signal and protocol parameters used by the access point for communication with the mobile terminal can be varied and is typically selected in dependence on the downlink channel quality. The channel quality is thus measured at the mobile terminal and a corresponding link mode is typically signaled in a link mode field to the access point, which adapts the modulation and coding scheme according to the signaled link mode. This means that the modulation and coding scheme can be optimized to the channel conditions, leading to a considerable improvement of the downlink channel throughput.

However, there exist many wireless communication standards, such as the IEEE 802.11 group of standards, which do not have any explicit signaling mechanism for link adaptation.

IEEE 802.11, for example, denotes a set of Wireless LAN standards developed by a working group of the IEEE LAN/MAN Standards Committee (IEEE 802). The IEEE 802.11 WLAN standard enables communication between stations in Infrastructure and Infrastructure-less systems. The former is denoted Basic Service Set (BSS), whereas the latter is called Independent BSS (IBSS) or ad hoc network mode in the IEEE 802.11 jargon. The 802.11 family currently includes six over-the-air modulation techniques that are all based on the same basic Medium Access protocol. The original standard, sometimes referred to as 802.11 legacy, defines Carrier Sense Multiple Access with Collision Avoidance (CSMA/CA) as the basic media access method. This has the advantage of improving the reliability of data transmissions under diverse and adverse channel conditions.

A general weakness of the original specification was that it offered so many choices that interoperability became a major challenge.

In 1999 the IEEE 802.11 standard was extended with a new physical layer based on Orthogonal Frequency Division Multiplexing (OFDM) and called IEEE 802.11a, enabling up to 8 different rates to be used. The maximum raw data rate is 54 Mbit/s, and the data rate can be reduced to 48, 36, 24, 18, 12, 9 and then 6 Mbit/s if required. IEEE 802.11a operates in the 5 GHz band, and uses 52 OFDM sub-carriers, 48 for data and 4 for pilots. Another standard called IEEE 802.11b for the 2.4 GHz band was also standardized enabling up to 4 different rates to be selected. In enabling the rate extensions, it was however left entirely up to the implementers to design an algorithm selecting the most suitable and appropriate rate at every instance.

More importantly, no mechanism for exchanging link adaptation messages between pairs of communicating stations was defined. Consequently, a station may merely perform link adaptation based on success or failure of earlier sent messages. This is an inefficient, slow and an unreliable method for link adaptation.

There is thus a general need to provide efficient support for link adaptation in wireless networks, such as IEEE 802.11 type of networks, which do not have any explicit signaling mechanism for link adaptation

SUMMARY OF THE INVENTION

The present invention overcomes these and other drawbacks of the prior art arrangements.

It is a general object of the present invention to provide improved support for link adaptation in wireless networks.

It is a specific object to provide efficient support for link adaptation in wireless networks that do not have any explicit signaling mechanism for link adaptation.

In particular it is desirable to provide an efficient signaling mechanism, preferably without changing any existing communication standard and/or preferably without introducing any additional overhead in the communication.

It is also a specific object to provide a close to instantaneous as well as robust signaling mechanism that is entirely backwards compatible for legacy stations overhearing the signaling.

These and other objects are met by the invention as defined by the accompanying patent claims.

Briefly, the invention concerns the issue of supporting link adaptation in a wireless network, and basically involves implicit signaling for link adaptation based on transfer of transmit duration information.

More particularly, a designated originating node sends a first message, including an indication of a current transmit duration, sometimes also referred to as a tentative transmit duration, for transfer of a predetermined amount of information, to at least a designated receiving node. The current transmit duration corresponds to a currently assumed data link rate, sometimes also referred to as a tentative link rate. The designated receiving node selects a desired data link rate for subsequent communication from the originating node, and then determines an updated transmit duration according to the selected data link rate. The receiving node sends a second message, including an indication of the updated transmit duration, to at least the designated originating node, and the originating node then determines an updated data link rate in response to the updated transmit duration.

In this way, support for link adaptation is provided in an efficient manner. In particular, the proposed mechanism does not require any standardization changes. Furthermore, it is not necessary to introduce any additional communication overhead.

Preferably, the receiving node takes the link adaptation decision by determining the desired link rate based on instantaneous and/or earlier information on reception characteristics.

The updated transmit duration is preferably determined by the designated receiving node based on the current transmit duration signaled by the designated originating node, the currently assumed link rate known by both the originating node and the receiving node, as well as the new desired link rate determined/selected by the receiving node.

The originating transmitting node updates the link data rate in response to the updated transmit duration signaled from the receiving node, assuming knowledge of a priori known information of previous transmission(s). Preferably, the updated link rate is determined based on the updated transmit duration and the predetermined amount of information to be transferred. Equivalently, the updated link rate may be determined based on the updated transmit duration and the current tentative duration together with the currently assumed tentative link rate.

The invention provides a fast implicit feedback mechanism through the signaling of the updated transmit duration corresponding to the desired data link rate such that the originating (transmitting) node will be able to update the link data rate on its side in response to the updated transmit duration. The originating node can thus be directed to select an "optimal" link rate to be used for sending data to the receiving node. The link rate selected by the originating node is typically the same or the closest possible (for example if the originating node and the receiving node do not support the same set of link rates) compared to the link rate selected by the receiving node.

The transmit duration for transfer of the given amount of information is hence not fully known at transmission of the first message, but first at the transmission of an updated transmit duration in a later message. The proposed signaling mechanism also allows other nodes to control their respective transmit permissions (e.g. through so-called Network Allocation Vectors) according to the selected link rates, and hence transmit durations, of the communicating nodes.

When sending data to the designated receiving node with the updated link rate, the corresponding transmit duration is preferably indicated in a transmit duration field in the data message.

In particular, for wireless networks operating based on a contention-based medium access protocol with transfer of transmit duration information for the purpose of virtual carrier sensing (e.g. IEEE 802.11 type networks), nodes overhearing the transmit duration information will be silent for the time period indicated in the transmit duration field so as to ensure collision avoidance (e.g. CSMA/CA). In this way, backwards compatibility is also ensured, where legacy terminals overhearing communication are brought to silence, with legacy frame formats exchanged between link adaptation capable stations or nodes.

By employing the transmit duration field in an existing frame format, there is no need to introduce any newly defined frame formats based on reserved and/or unreserved new fields, thus eliminating present or future compatibility problems.

Depending on the particular medium access control (MAC) protocol used in the wireless network, the transmit duration information may be conveyed in different messages. In a contention-based MAC protocol with Request-To-Send/Clear-To-Send (RTS-CTS) message exchange, the tentative (current) transmit duration is preferably indicated in the RTS message and the updated transmit duration is preferably indicated in the CTS message. With data fragmentation, transmit duration information may alternatively or as a complement be indicated in data fragment messages and corresponding data acknowledgment messages.

In a particular exemplary embodiment of the invention, the updated transmit duration is preferably determined by first estimating an expected amount of information to be received at least partly based on the currently assumed data link rate and the signaled current transmit duration. Next, the updated transmit duration is determined at least partly based on the determined amount of information and the desired data link rate.

Since the overall transmit duration for a given amount of information normally includes the duration for transfer of payload data and control information as well as silent control periods, it may be highly beneficial to consider more detailed MAC (Medium Access Control) protocol information when calculating the updated transmit duration.

The currently assumed data link rate on the transmitting side may be a priori known, or indicated by explicit signaling, or determined based on one or more previous indications of transmit duration by the designated receiving node. In the latter case, it is desirable that the previous indication or indications occurred within a predetermined period of time so as to be up-to-date.

The invention offers the following advantages:
➢Implicit signaling for link adaptation.
➢Efficient support for link adaptation in wireless networks.
➢Improved exploitation of the communication medium.
➢No need for changes in existing communication standards.
➢No additional overhead.
➢Backwards compatibility is ensured.
➢No need to introduce any newly defined frame formats.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
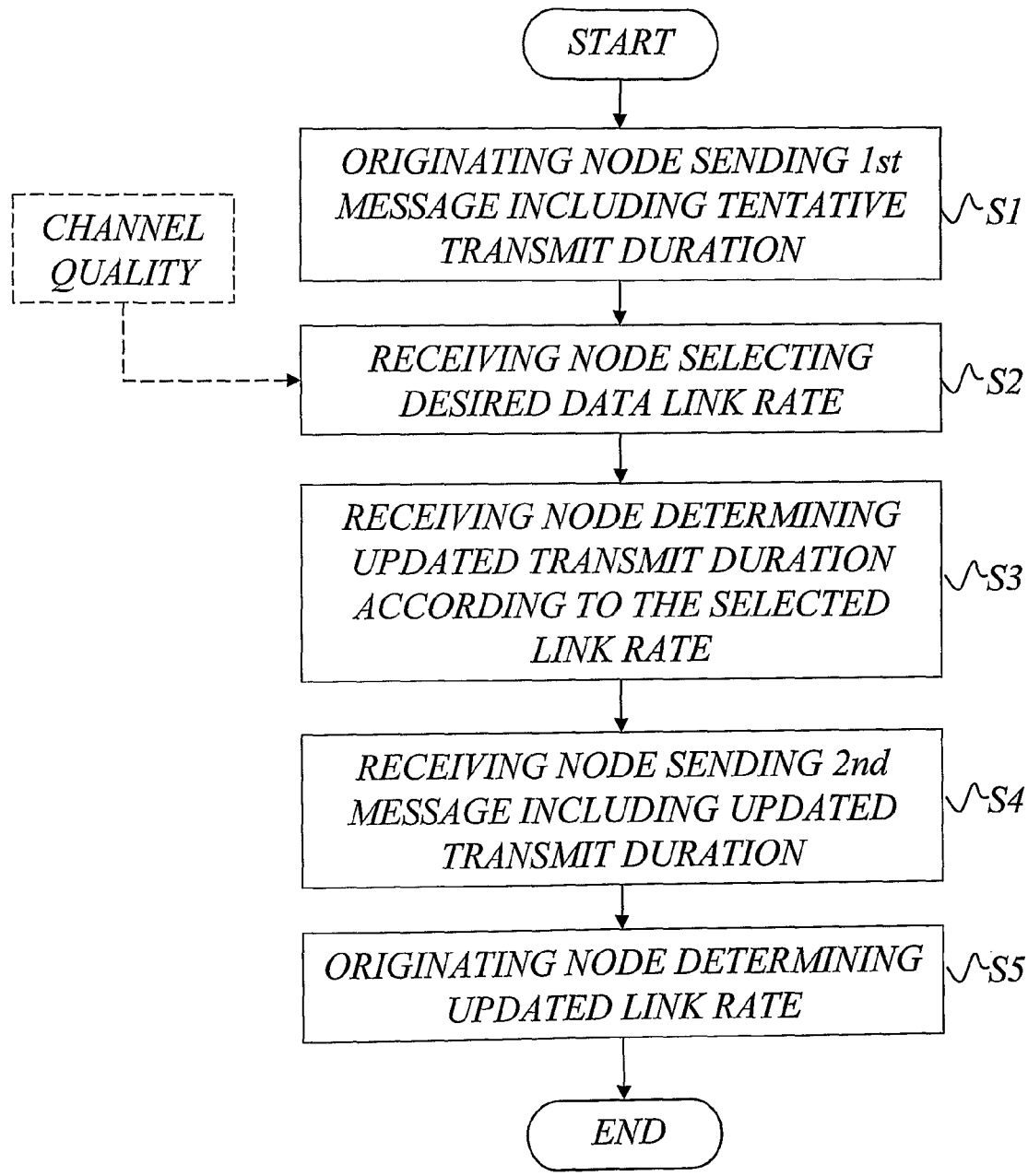
FIG. 1 is a schematic flow diagram according to an exemplary preferred embodiment of the invention.

Throughout the drawings, the same reference characters will be used for corresponding or similar elements.

The present invention concerns the problem of supporting link adaptation in wireless networks that do not have any explicit signaling mechanism for link adaptation.

For example, in IEEE 802.11 type of networks, although multiple rates are defined, it is left entirely up to the implementers to design an algorithm selecting the most suitable and appropriate rate at every instance. In addition, there is no mechanism for exchanging link adaptation messages between pairs of communicating stations, and consequently, a station may merely perform link adaptation based on success or failure of earlier sent messages. As noted earlier, this is an inefficient, slow and an unreliable method for link adaptation.

An initial starting point could perhaps be to use the presence and absence of acknowledgements as a method for ramping up or down the rate. However, a signaling mechanism based on absence and presence of acknowledgement requires communication to endure for some time in order for a suitable rate to be found. Even when it is found, the chosen rate would only be selected in an average sense not taking into account that the channel may change abruptly and that the instantaneous interference situation may vary and hence the chosen rate will clearly be non-optimal.

An additional problem is also that the scaling up and down of the rate is blind in the sense that an entire MAC Protocol Data Unit (MPDU) can be wasted just to find out that the rate is not feasible and must therefore be scaled down. In a similar manner, a lower rate may be used than could actually be supported, and this means that the full potential of the medium is not exploited.

The invention proposes an entirely different solution involving an implicit signaling mechanism for link adaptation based on transfer of transmit duration information.

The invention in accordance with an exemplary preferred embodiment of the invention will now be described with reference to the schematic flow diagram of FIG. 1.

In step S1, a designated originating node, sometimes referred to as a source node, sends a first message to at least a designated receiving node, sometimes referred to as a destination node. The first message from the originating node includes an indication of a current transmit duration (also referred to as a tentative duration) for transfer of a predetermined amount of information. The current or tentative transmit duration typically corresponds to a currently assumed data link rate (also referred to as a tentative link rate). In step S2, the designated receiving node selects a desired data link rate for subsequent communication from the originating node. Preferably, the receiving node takes the link adaptation decision by determining the desired link rate based on instantaneous and/or earlier information on channel quality (reception characteristics) as indicated by the (optional) dashed box in FIG. 1. In step S3, the receiving node determines an updated transmit duration according to the selected data link rate. In step S4, the receiving node sends a second message, including an indication of the updated transmit duration, to at least the designated originating node. In step S5 the originating node then determines an updated data link rate in response to the updated transmit duration.

Thus, the invention provides support for link adaptation in a highly efficient manner, which does not require any standardization changes and does not introduce any additional communication overhead.

By employing the transmit duration field in an existing frame format, there is no need to introduce any newly defined frame formats based on reserved and/or unreserved new fields, thus eliminating present and future compatibility problems. A change in a standard such as the IEEE 802.11 standard may however allow introduction of new frame formats. This would however not be sufficient, as legacy stations must still be able to set their NAVs for collision avoidance.

The originating node may then perform link adaptation in accordance with the updated link rate, sending data to the receiving node with a link mode (modulation and coding scheme) that corresponds to the updated link rate. The originating transmitting node preferably also indicates the corresponding transmit duration value in the duration field of the data frame.

Preferably, the updated transmit duration is determined by the designated receiving node based on the current transmit duration signaled by the designated originating node, the predetermined (currently) assumed link rate known by both the originating node and the receiving node, as well as the new desired link rate determined by the receiving node.

The predetermined assumed data link rate may be a priori known, or indicated by explicit signaling, or determined based on one or more previous indications of transmit duration by the designated receiving node. In the latter case, it is desirable that the previous indication or indications occurred within a predetermined period of time so as to be up-to-date.

In a particular exemplary embodiment of the invention, the updated transmit duration is preferably determined by first estimating an expected amount of information to be received at least partly based on the currently assumed data link rate and the signaled tentative or current transmit duration. Next, the updated transmit duration is determined at least partly based on the determined amount of information and the desired data link rate. Since the overall transmit duration for a given amount of information normally includes the duration for transfer of payload data and control information as well as silent control periods, it may be highly beneficial to consider more detailed MAC (Medium Access Control) protocol information when calculating the updated transmit duration, as will be explained in detail later on.

The invention provides a fast implicit feedback mechanism through the signaling of the updated transmit duration (corresponding to a desired data link rate) from the receiving node to the transmitting node such that the transmitting node, knowing the amount of data to be transferred or equivalent a priori known information, will be able to update the link data rate on its side in response to the updated transmit duration. The originating node can thus be directed to select an "optimal" link rate to be used for sending data to the receiving node. When subsequently sending data to the designated receiving node with the updated link rate, the corresponding transmit duration is preferably indicated in a transmit duration field in the data message.

The transmit duration for transfer of the given amount of information is hence not fully known at transmission of the initial message, but at the earliest by the time of transmission of an updated transmit duration in a later message. The proposed signaling mechanism allows other nodes to control their respective transmit duration settings (such as Network Allocation Vectors) according to selected link rates of the communicating nodes. In particular, for wireless networks operating based on a contention-based medium access protocol with transfer of transmit duration information for the purpose of so-called virtual carrier sensing (e.g. IEEE 802.11 type networks), nodes overhearing the transmit duration information will be silent for the time period indicated in the transmit duration field so as to ensure collision avoidance (e.g. CSMA/CA). In this way, backwards compatibility is also ensured, where legacy terminals overhearing communication are brought to silence, with legacy frame formats exchanged between link adaptation capable stations or nodes.

Depending on the particular medium access control (MAC) protocol used in the wireless network, the transmit duration information may be conveyed in different messages. In a contention-based MAC protocol with Request-To-Send/Clear-To-Send (RTS-CTS) message exchange, the tentative or current transmit duration is preferably indicated in the RTS message and the updated transmit duration is preferably indicated in the CTS message. With data fragmentation, transmit duration information may alternatively or as a complement be indicated in data fragment messages and corresponding data acknowledgment messages.

For a better understanding, a brief overview of contention-based communication networks with collision avoidance based on physical and virtual carrier sensing will now be given.

In contention-based communication networks, such as IEEE802.11, the stations and network nodes generally compete or contend for the shared physical media. A typical example of contention-based media access is the Floor Acquisition Medium/Multiple Access (FAMA) scheme. This class of access protocol, that acquires a "floor" or equivalently blocks a set of nodes from using the medium, has closely related cousins, including but not limited to Multiple Access with Collision Avoidance (MACA) and Distributed Foundation Wireless Media Access Control (DFWMAC).

DFWMAC is used in IEEE 802.11 and is then denoted Distributed Coordination Function (DCF). Common for all these medium access schemes is that they are based on CSMA. CSMA is a non-deterministic Medium Access Control (MAC) protocol in which a network node verifies the absence of other traffic before transmitting on the shared physical medium.

The CSMA access method is often used in combination with Collision Avoidance (CA) mechanisms in the form of Carrier Sense (CS), which basically means that a network node listens for carrier signals to detect the presence of an encoded signal from other nodes in the network before it attempts to send. If a carrier signal is sensed, the node waits for the transmission in progress to finish before initiating its own data transmission. The CS concept is typically divided into two different CS mechanisms, denoted physical CS and virtual CS.

According to the physical CS mechanism, a network node continuously or intermittently investigates whether the physical medium is busy. In this context, a network node typically regards the medium as busy and should refrain from transmitting data if an experienced power sensitivity level is exceeded. For example, if the node detects a signal power level in the medium that exceeds a minimum signal threshold, typically denoted Clear Channel Assessment (CCA) level in some communication networks, the medium is regarded as busy. Alternatively, the medium is regarded as occupied if the interference experienced by the network node exceeds a minimum interference threshold. In either case, if the node considers the physical medium as busy it refrains from sending data.

The CSMA/CA protocol often reduces the probability of collisions among nodes sharing the medium by utilizing a random back-off time after the node's physical sensing mechanism indicates a free medium.

As mentioned, IEEE 802.11 uses a MAC protocol based on CSMA/CA (Carrier Sense Multiple Access/Collision Avoidance). In general, a station must first sense the medium for a specific time interval and if the medium is idle the station can start transmitting. Otherwise, the transmission is deferred and a back-off process begins, which means that the station has to wait for a given time interval. Once the back-off time has expired, the station can try to access the medium again.

The currently preferred access mechanism in most 802.11 networks is Distributed Coordination Function (DCF), which is based on CSMA/CA. In addition to physical carrier sensing, so-called virtual carrier sensing is also used where a duration value indicates the length of the transmission in each transmitted packet. Stations receiving the duration field shall not transmit on the wireless media for a period of time equal to the value of the duration field. In order to handle the "hidden terminal" problem, a Request-To-Send/Clear-To-Send (RTS/CTS) hand-shaking mechanism is used.

There are two modes of channel access scheme operation in DCF, one based on CSMA/CA directly and one based on CSMA/CA with RTS/CTS message exchange. A Management Information Base (MIB) attribute dot11RTSThreshold is used to differentiate the use of the two alternatives. MAC Protocol Data Units (MPDUs) shorter than the threshold is sent without RTS-CTSs whereas longer MPDUs are sent with RTS-CTSs. The RTS-CTS based CSMA/CA mechanism enables mitigation of hidden stations and hence in general provides a more efficient use of the wireless medium, at least for moderately large packets.

Figure 2A:
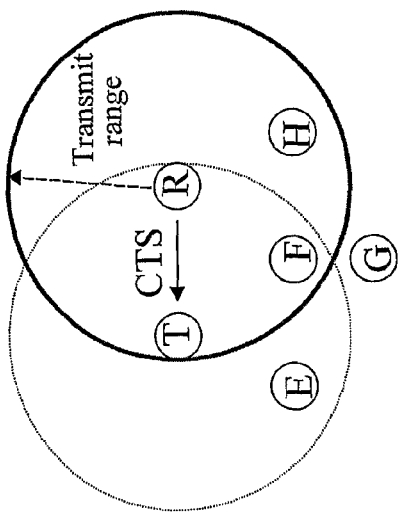
FIGS. 2A-D schematically illustrate relevant parts of a wireless contention-based network that employs RTS/CTS-based CSMA/CA and physical carrier sensing.
Figure 2B:
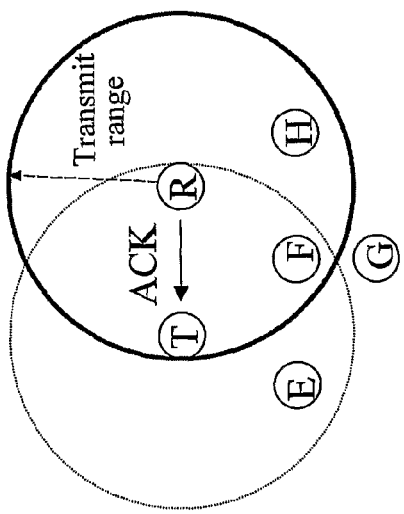
Figure 2C:
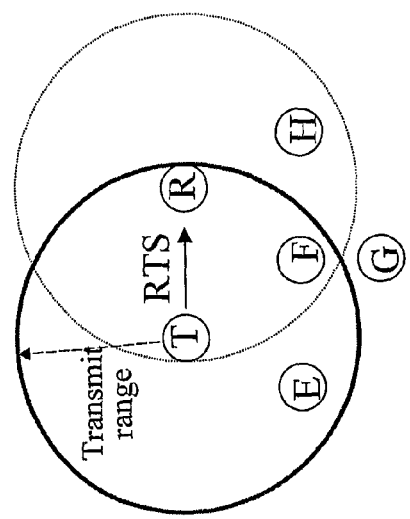
Figure 2D:
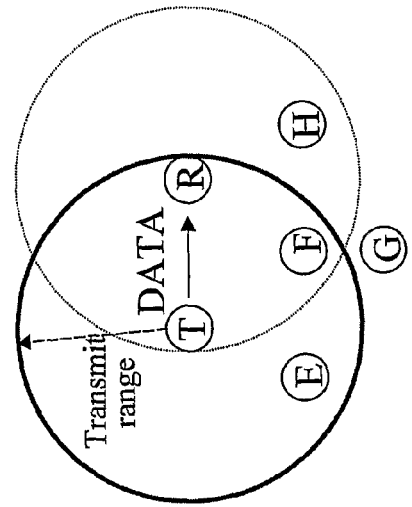

FIGS. 2A-D schematically illustrate relevant parts of a wireless contention-based network that employs RTS/CTS-based CSMA/CA and physical carrier sensing. In these figures, payload data is to be forwarded from a first node to a second node on a wireless link. The first node sending RTS and DATA is here denoted with T, whereas the station sending CTS and ACK is denoted R. The first node T has a given transmit range enclosing a certain area. Other network nodes E, F present within this area will sense the forwarding of data of the transmitting node T and are consequently blocked by such data forwarding (FIG. 2A). In the same way, the second node R has a given transmit range enclosing a certain, which may differ in size and shape compared to the blocking area of the transmitting node T. This means that other and/or same network nodes F, H present within this blocking area will become blocked if the second node R transmits data on the wireless link to the first node T (FIG. 2B). When the first node T has received the CTS message from node R, it starts transmitting DATA (FIG. 2C). The node denoted H is a hidden station for node T. The hidden station H is informed of the intention of node T to transmit via the CTS message received from node R. As a consequence, node H will not transmit and disturb ongoing reception of DATA by node R. The nodes E and F will in a similar manner defer channel access overhearing RTS and/or CTS, whereas node G may transmit as it has not overheard the RTS or CTS frames. Once node R has received DATA from node T, node R sends an ACK back to the transmitting node T (FIG. 2D).

Figure 3:
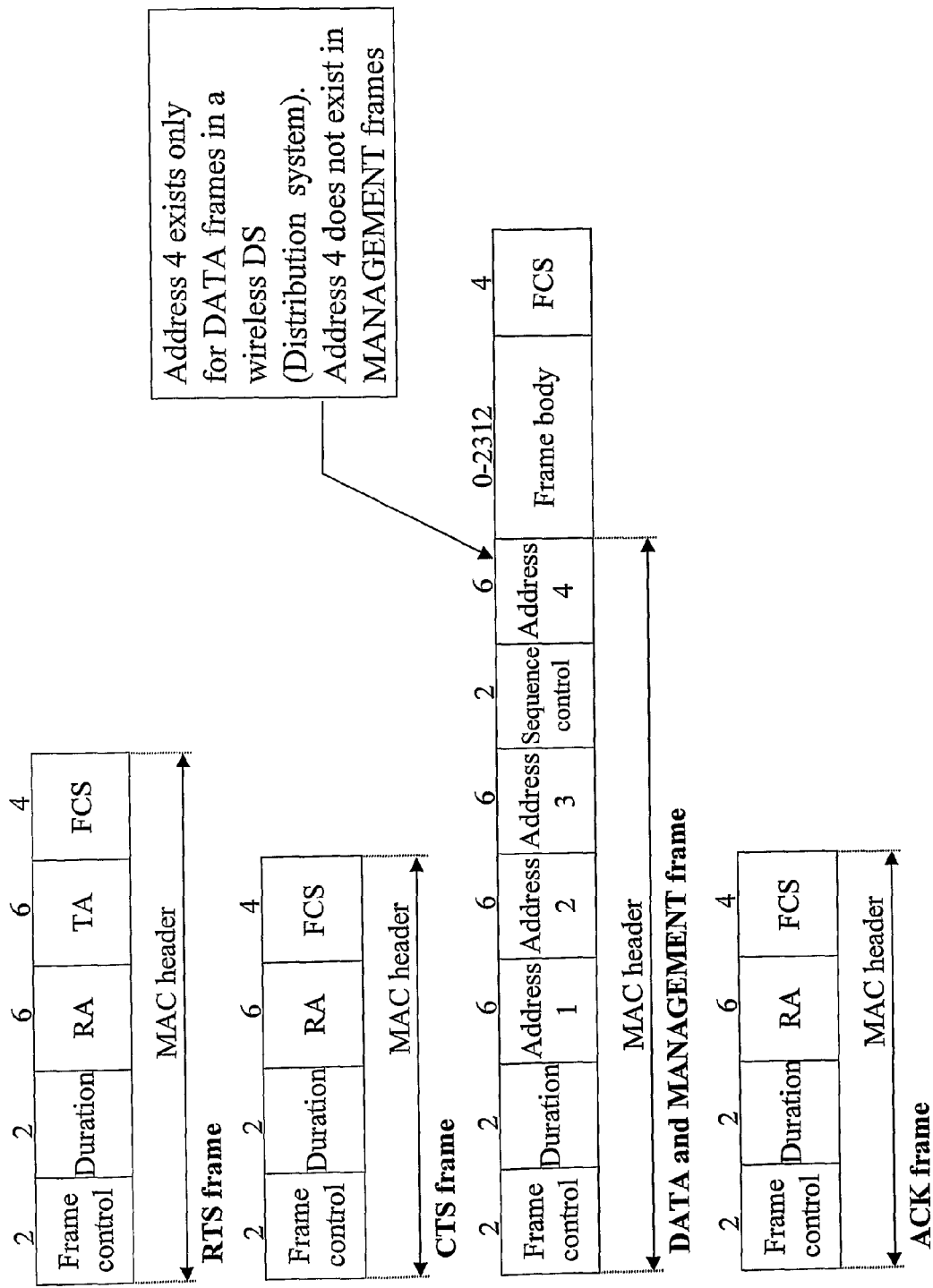
FIG. 3 illustrates the frame format used in IEEE 802.11.

The frame format used in IEEE 802.11 is illustrated in FIG. 3. The RTS frame comprises a frame control field, a duration field, a Receiver Address (RA) field, a Transmitter Address (TA) field and a Frame Check Sequence (FCS). The CTS and ACK frames, likewise, each comprises frame control, duration, RA and FCS fields. Finally, the payload frame contains the frame control field, duration field, address fields, a sequence control field, a frame body and a FCS field.

As the person skilled in the art knows, the duration field comprises a duration value that is employed for providing an additional collision avoidance mechanism to physical carrier sensing, namely virtual carrier sensing. The duration values reflect the expected time at which the communication between the transmitting and receiving nodes is completed.

Figure 4:
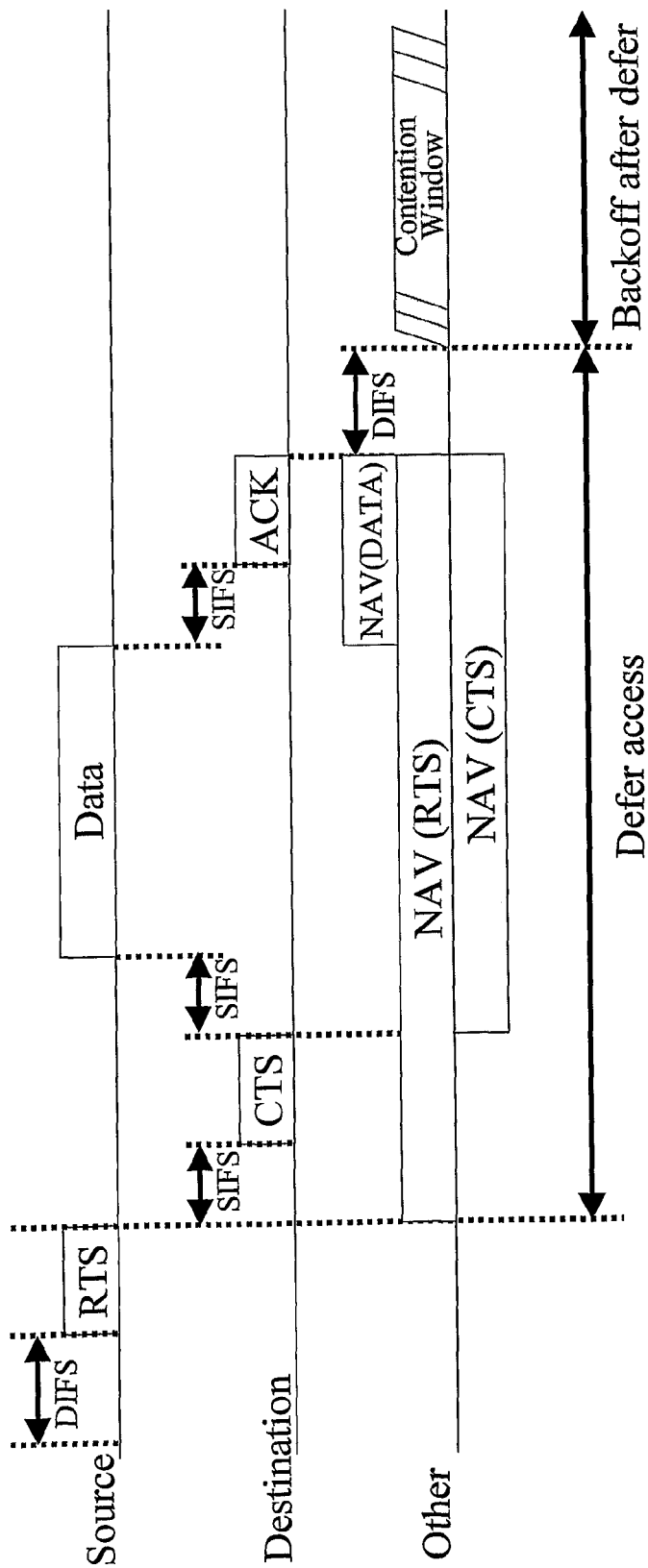
FIG. 4 is a schematic frame exchange diagram illustrating the basic mechanisms behind virtual carrier sensing.

The mechanisms behind virtual carrier sensing will now be briefly outlined with reference to the frame exchange illustrated in FIG. 4. A transmitting node sends an RTS frame and a payload (data) frame, and a receiving node returns a CTS frame and an ACK frame. When frames are received by other nodes or stations than the intended, a so called NAV (Network Allocation Vector) is set in accordance to a duration value indicated in a given field of the frame. This provides an additional collision avoidance mechanism to the physical channel access sensing. As long as either the physical or virtual carrier sense indicates activities on the channel a node must remain silent.

In addition, a node should not access the channel until a given time period, denoted DCF Inter-Frame Space (DIFS) in IEEE 802.11, has elapsed since the last time the channel was occupied, either given by the physical or virtual carrier sense. The Short Inter-Frame Space (SIFS) is a time period used for separating transmissions belonging to a single dialog between a pair of nodes. For example, this will allow the transmitting node to switch back to receive mode and be capable of decoding incoming messages such as CTS and ACK.

When the channel becomes free, stations start contending for the channel according to the channel access principles defined in IEEE 802.11 and similar contention-based protocols. In general, the NAV can only be extended if new frames are received. There exist some special instances when the NAV can be reset as well, but that is not part of the normal operation.

Figure 5:
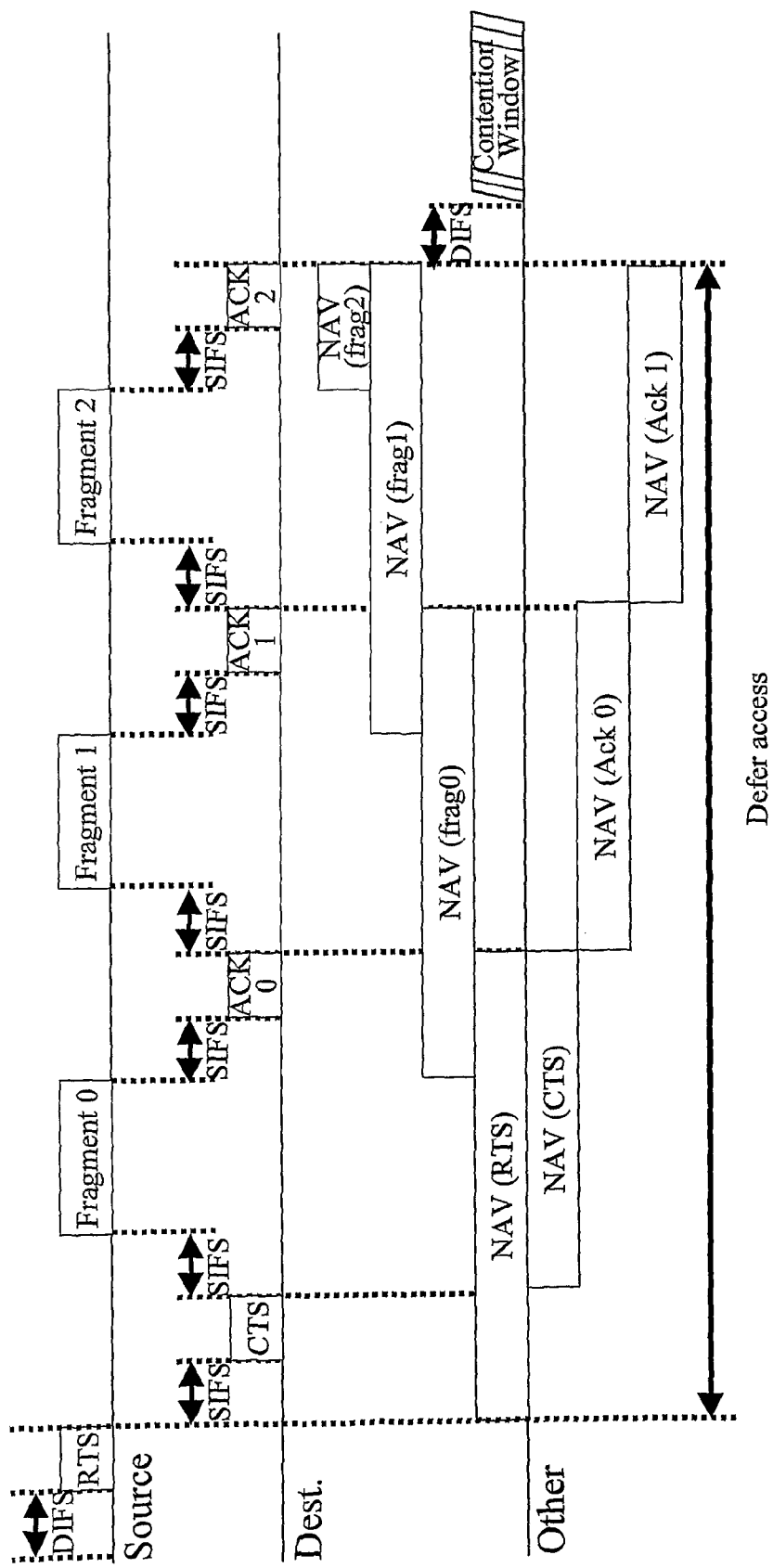
FIG. 5 is a schematic frame exchange diagram with fragmentation of data.

The principles of collision avoidance and RTS/CTS-usage can also be applied to fragmentation of the payload data, which is evident from FIG. 5. Each payload fragment is associated with a respective ACK frame. The payload fragments and ACK act as implicit RTS and CTS. Additional fragments could be indicated by a bit (field) in the frame control of the fragments, allowing the receiving node to determine the remaining number of expected fragments to be received.

According to the standard, CTS should be sent with the same link rate as RTS, and ACK should be sent with the same link rate as DATA. The original purpose is to enable the transmitting node or station to calculate the duration value prior to RTS transmission.

As described above, the idea of the invention is to intelligently use the duration field to signal link mode. For example, when using an RTS-CTS exchange scheme, the transmitting node may assume a certain rate and indicate a corresponding duration in the duration field of the RTS. The receiving node adjusts the duration field in the CTS according to a desired link mode, which is preferably selected by the receiving node based on available channel quality information. In the transmitting node, the DATA link mode is then adjusted in response to the duration field of the CTS, and the new duration is announced in the DATA frame duration field. In a contention-based network with virtual carrier sensing, nodes overhearing the CTS will be silent for the time indicated in the CTS, and stations overhearing the duration field in the DATA frame will update the time they will be silent.

The invention will now be described with reference to a number of specific embodiments of the invention that are particularly suited for IEEE 802.11 type of networks. It should however be understood that the invention is not limited thereto. The invention rather concerns a general mechanism for supporting link adaptation in wireless networks.

Also, the invention will mainly be described in relation to RTS-CTS exchange with appropriate duration field setting, but there is nothing that prevents duration fields in other messages such as DATA and ACK messages to be used as a complement to, or instead of, the RTS and CTS duration fields.

In the following it is assumed that the transmitting node and receiving node are link adaptation enabled according to the invention. This may be the result of exchanged capability information, e.g. by utilizing existing (IEEE 802.11) capability exchange mechanisms with minor extensions, or alternatively based on a company specific MAC address defined through an Organizationally Unique Identifier (OUI). The OUI is 24 bit long and part of the Ethernet MAC address. In the latter case, an originating node that wants to communicate with another node can, based on the OUI, identify the vendor of that node. The sending node may consult a list of vendors supporting the link-signaling scheme described according to the invention.

As mentioned, the invention preferably uses a fast feedback mechanism in the CTS message such that the transmitting node can be directed to select the optimum instantaneous link rate. The basic link adaptation principle of using information on the reception characteristics in one node for link adaptation in another node will come in useful here as well, since the receiving node will be able to take the link adaptation decision with all instantaneous information on reception characteristics. For example, a receiving node may know which instantaneous CIR or equivalent channel quality measure it experienced when receiving the RTS message. Based on this information the node may determine the optimum link rate out of the available link rate set and issue a CTS message with a duration value that corresponds to the selected link data rate.

However, while the CTS feedback is fast, the mechanism for determining the link rate could determine the preferred average link rate (and hence mode) based on previous communication.

The proposed mechanism of adjusting and broadcasting the duration allows overhearing nodes to set their respective NAV configuration according to the selected rate of the currently communicating nodes.

An important aspect of the link adaptation signaling of the present invention is the interpretation of the duration field that exists in the frames of most contention-based network protocols such as IEEE 802.11 (apart from PS-poll), thereby providing a solid backward and future compatible foundation for signaling. As the RTS frame is issued, the duration field is set according to a predetermined assumed data rate. This may for example be the highest common data rate that both stations can use, or the highest rate of the transmitting node. Alternatively, the transmitting node simply selects a rate by chance. In response to the RTS, the receiving node determines a desired link rate. For example, the selected desired link rate may be lower than the initially assumed link rate used for the RTS, and a lower link rate dictates a longer data transfer duration. The new duration is indicated in the CTS duration field, and the CTS frame is broadcasted. In doing so, hidden terminals are prevented from accessing the medium for the correct reception interval, and at the same time the transmitting node will be informed of the expected and recommended link rate. The updated link rate in the transmitting node is roughly given by the updated transmit duration and the length or amount of data to be transferred.

Basic Approximate Calculations

The receiving node knows the predetermined (currently) assumed tentative rate $N_{ASSUMED}$, and the tentative or current duration $DUR_{TENTATIVE}$, and can thus determine an approximate estimate of the expected amount of data $L_{DATA}$ to be received/transferred:

$$L_{DATA}=N_{ASSUMED} \cdot DUR_{TENTATIVE}$$

The updated transmit duration $DUR_{UPDATED}$ can then be estimated based on the determined amount of data $L_{DATA}$ and the desired data link rate $N_{DESIRED}$ selected by the receiving node:

$$DUR_{UPDATED}=L_{DATA}/N_{DESIRED}=\\(N_{ASSUMED} \cdot DUR_{TENTATIVE})/N_{DESIRED}$$

This means that based on the updated transmit duration $DUR_{UPDATED}$ signaled from the receiving node, the transmitting node can extract the desired link rate $N_{DESIRED}$ as follows:

$$N_{DESIRED}=L_{DATA}/DUR_{UPDATED}.$$

Knowing that $L_{DATA}=N_{ASSUMED} \cdot DUR_{TENTATIVE}$ the above relation can, equivalently, be translated so that the desired link rate is expressed as a ratio between the tentative or current duration value indicated in the RTS frame and the updated duration indicated in the CTS frame:

$$N_{DESIRED}=N_{ASSUMED} \cdot (DUR_{TENTATIVE}/DUR_{UPDATED}).$$

Assuming that the highest "common" data rate is 54 Mbps as in 802.11a, Table 1 below will give a (rough) picture of possible signaled data rates.

TABLE 1

| $DUR_{TENTATIVE}/DUR_{UPDATED}$ ratio | Signaled rate [Mbps] |
|---|---|
| 1 | 54 |
| 8/9 | 48 |
| 2/3 | 36 |
| 4/9 | 24 |
| 1/3 | 18 |
| 2/9 | 12 |
| 1/6 | 9 |
| 1/9 | 6 |

The transmitting node first tries to select the same rate if possible, but if the transmitting node and the receiving node do not support the same set of link rates the transmitting node typically selects the closest possible rate.

If the channel quality is poor, lower order modulation may be selected together with a coding scheme of relatively low coding rate. With improved channel quality comes the possibility to use a higher order modulation and higher coding rates. In general, higher order modulation and higher coding rates give higher data transfer rates than lower order modulation and lower coding rates. An example of practical modulation and coding includes 64QAM and convolutional coding.

Exemplary Signaling Diagrams

Figure 6:
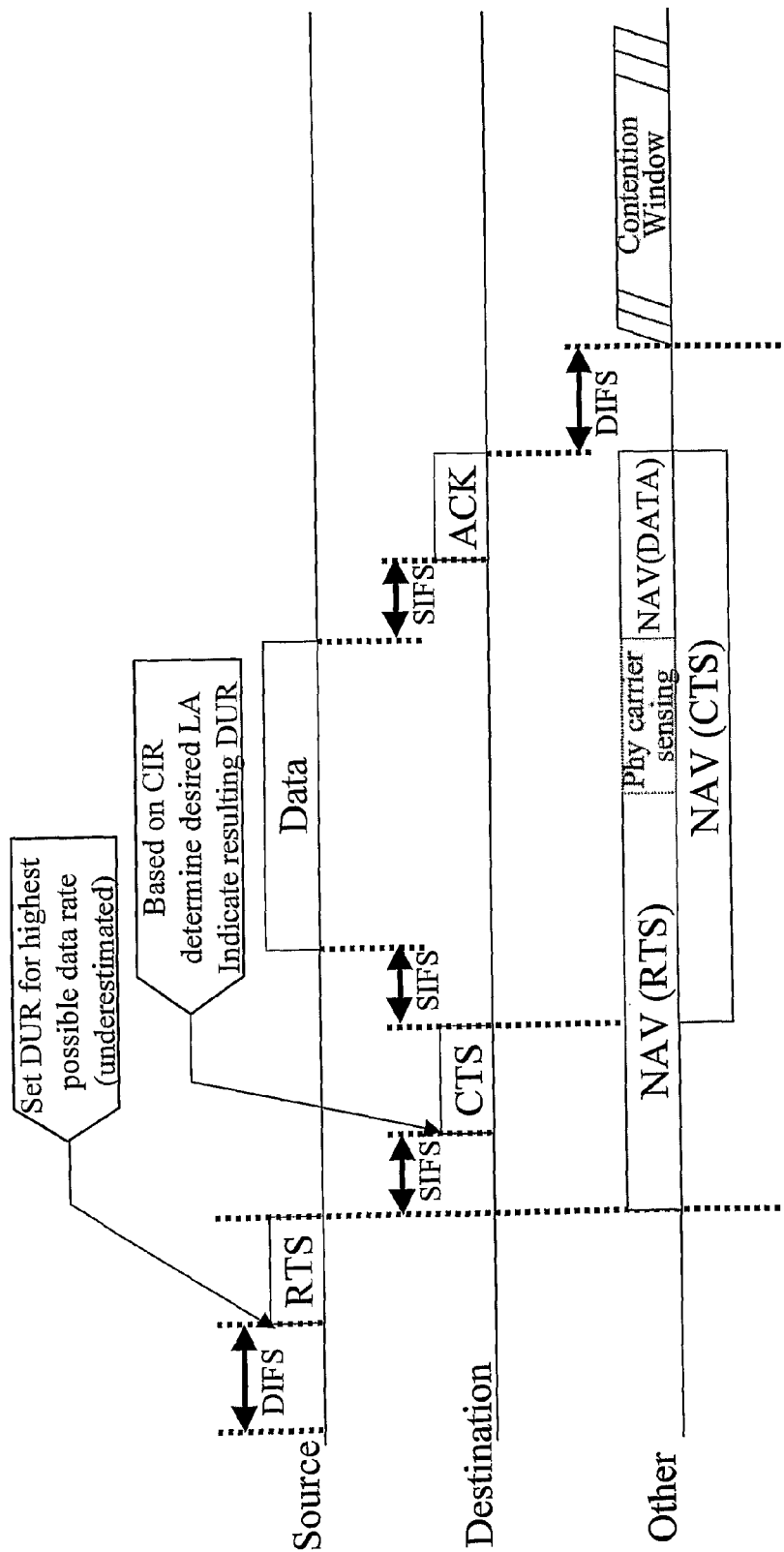
FIG. 6 is a schematic diagram of an exemplary embodiment of the invention based on basic RTS-CTS exchange.

FIG. 6 is a schematic diagram of an exemplary embodiment of the invention based on basic RTS-CTS exchange. In this particular example, the transmitting node (source) assumes the highest possible data rate, which translates into a relatively short duration value (underestimated). This normally means that the NAV set by RTS has shorter duration than the actual duration of the subsequent data transmission since the initial data rate assumed by the transmitting node is higher than the rate finally selected by the receiving node. The receiving node (destination) preferably determines the desired link rate in dependence on the experienced CIR when receiving the RTS, and signals a corresponding duration in the CTS. The source node extracts the duration value from the CTS duration field. The source node then determines an updated link rate in response to the CTS signaled duration value, and performs link adaptation accordingly. Stations that merely overhear the RTS of the transmitting node preferably rely on the physical carrier sense of the data transmission to prevent them from accessing the medium. This is an efficient and simple method. However, virtual carrier sensing is not employed all the time for those nodes that merely detect the RTS and not the CTS message. For greater reliability it may sometimes be beneficial to be able to set the virtual carrier sense all the time for those nodes that merely overhear the source transmission.

Figure 7:
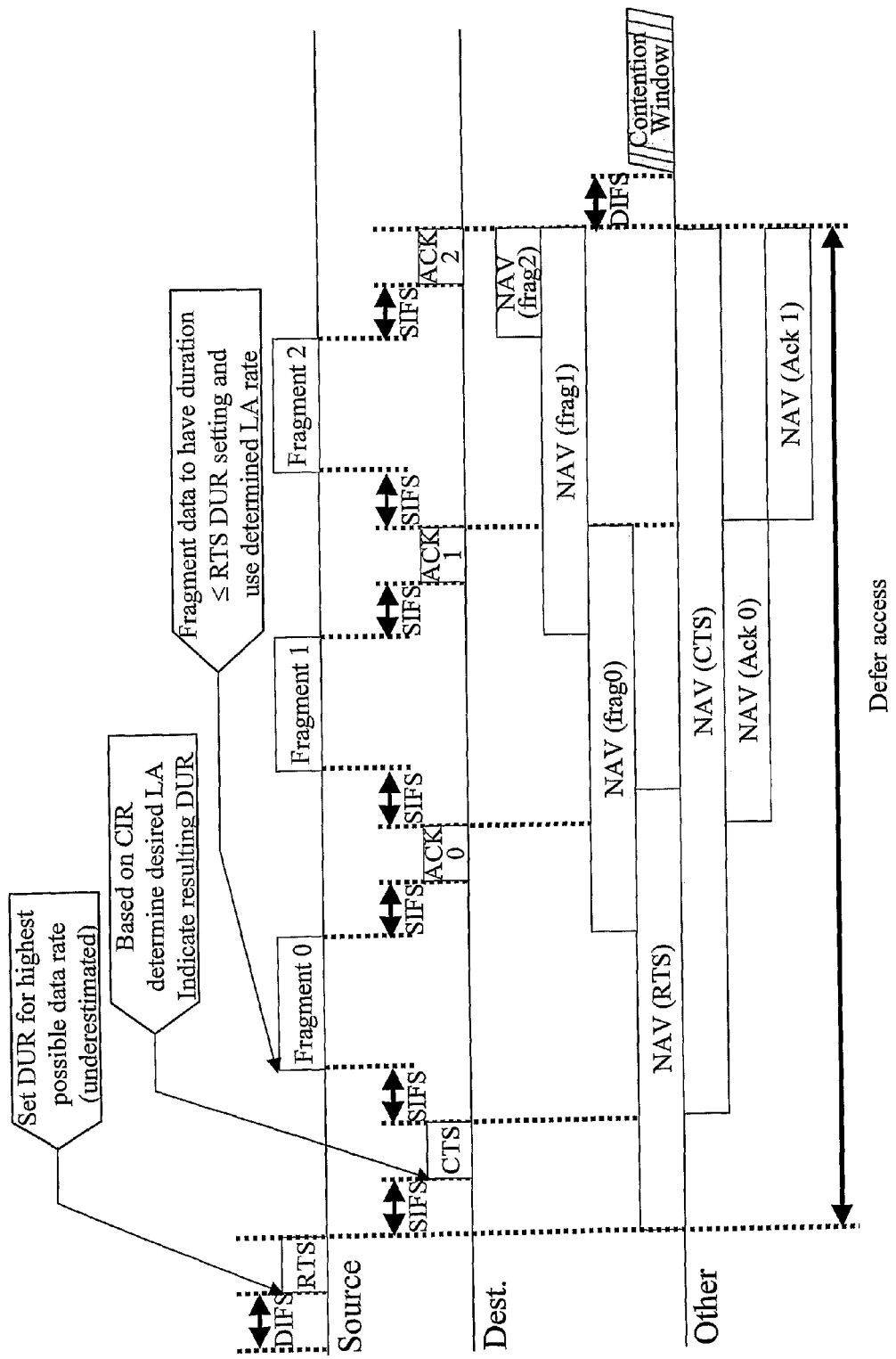
FIG. 7 is a schematic diagram illustrating an exemplary embodiment based on fragmentation.

FIG. 7 is a schematic diagram illustrating an exemplary embodiment based on fragmentation. So-called MSDU fragmentation is another technique to enable nodes merely overhearing the transmissions of the source node to set their NAV. The cost of having fragmentation is the additional overhead in terms of SIFS, ACK and physical layer overhead. In 802.11a for example, as the lowest data rate is 9 times lower than the highest link rate, a maximum of 10 fragments may be used due to 22 bits of overhead added per fragment. In this embodiment, the duration value in the RTS is related to a data fragment and the corresponding acknowledgment (ack) and determined using the initially assumed data rate. The updated transmit duration corresponding to the desired link rate selected by the destination node is signaled in the CTS frame. The duration field in a data fragment is set to last over the fragment's own ack, as well as the next fragment and ack, but determined using the updated link rate. For example, the duration indicated in a data fragment may include a SIFS period, the ack of the current fragment, another SIFS period, the next fragment, yet another SIFS period as well as the ack of the next fragment. The duration field in an ack is set to last over the next fragment and ack.

Figure 8:
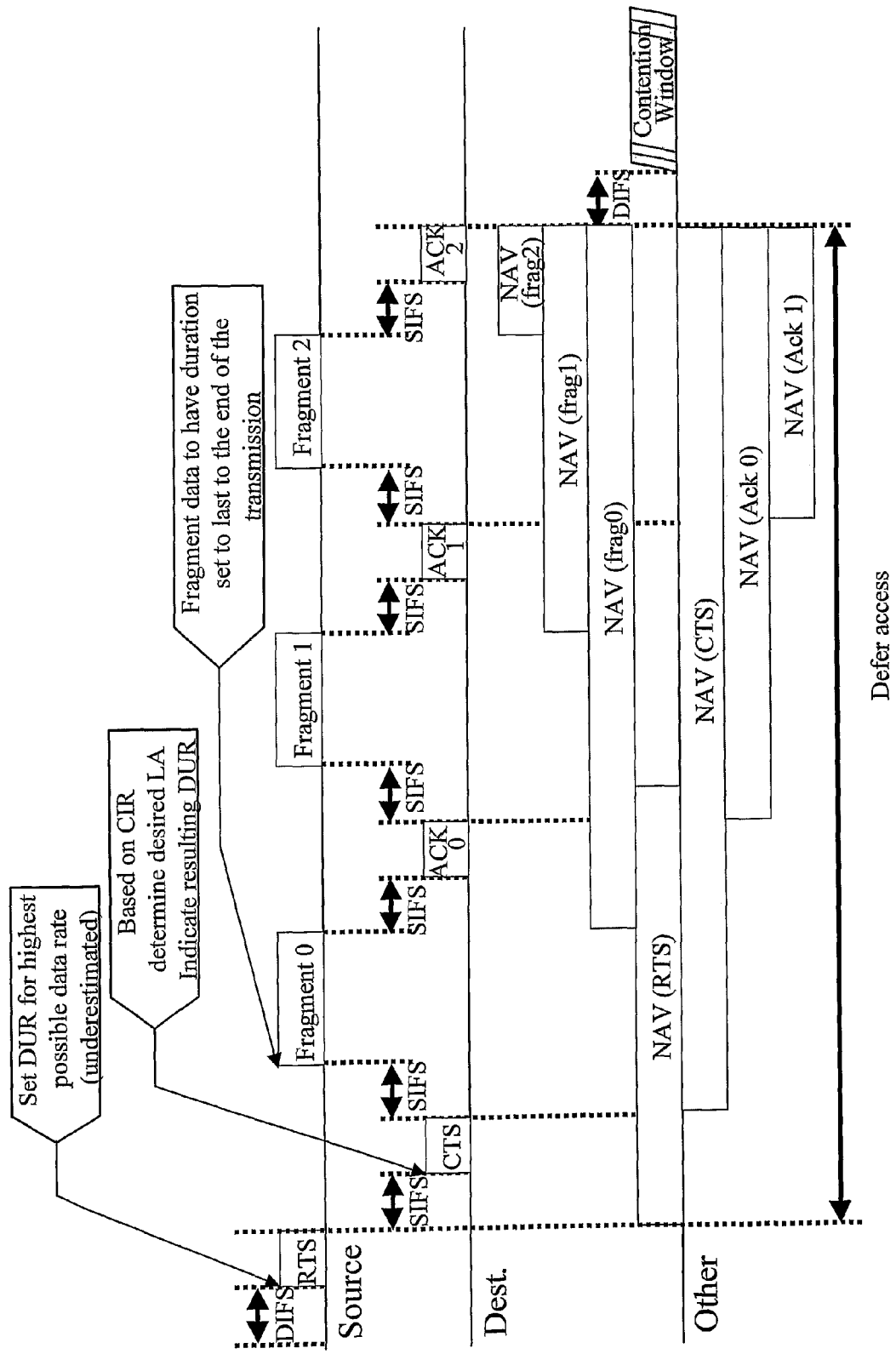
FIG. 8 is a schematic diagram illustrating another exemplary embodiment of the invention.

As illustrated in the schematic diagram of FIG. 8, a variation is to set the duration field in data fragments and acks to last to the end of the entire MSDU transmission. It is understood that other variations are possible, and the embodiments presented herein are merely exemplary.

It is further understood that other exemplary embodiments are possible where the duration field in the acknowledgement is used for additional signaling of necessary link rate changes. This is a clear advantage since the link rate can be adapted to changes in channel quality at several instances during the fragmented data and ack transmission procedure. This implies that an updated transmit duration is indicated from the destination node in each ack, and that corresponding link adaptation is performed in the source node in response to the continuously updated transmit duration.

The fragmentation process of IEEE 802.11 allows retransmissions. It is understood that retransmissions will cause the termination point for the NAV vector to move forward accordingly. This is controlled by the source node by setting the normal "more fragment" indication.

Figure 9:
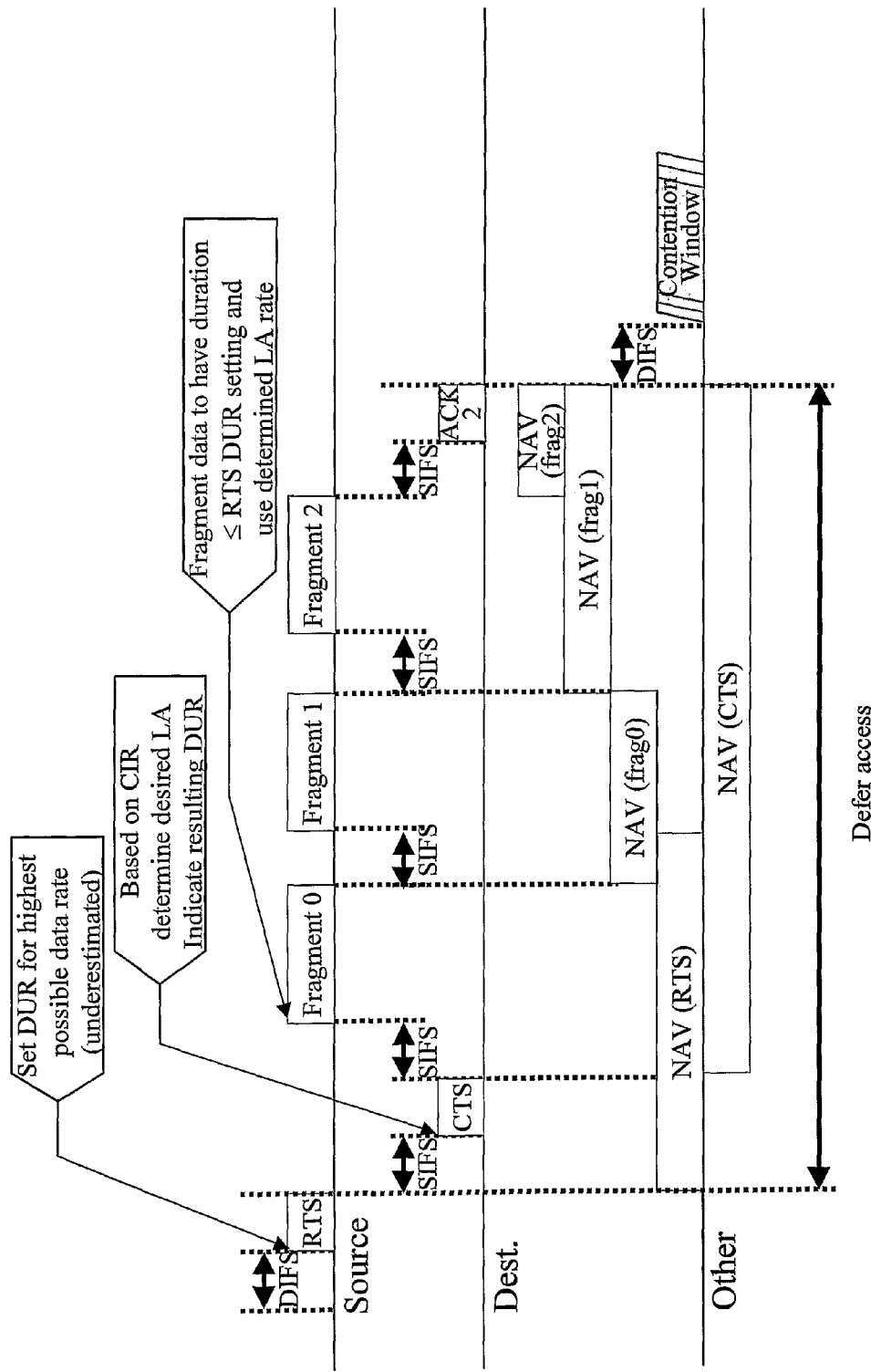
FIG. 9 is a schematic diagram illustrating an exemplary embodiment using a delayed acknowledgment scheme.

As illustrated in the schematic diagram of FIG. 9, another embodiment involves a proprietary delayed acknowledgement scheme, where there is an ack only at the end of the last fragment, and each data fragment except for the last one indicates a duration that only last over the next fragment. The purpose of fragmentation is primarily to enable NAV setting and retain reasonable compatibility to the IEEE 802.11 standard MAC.

Figure 10:
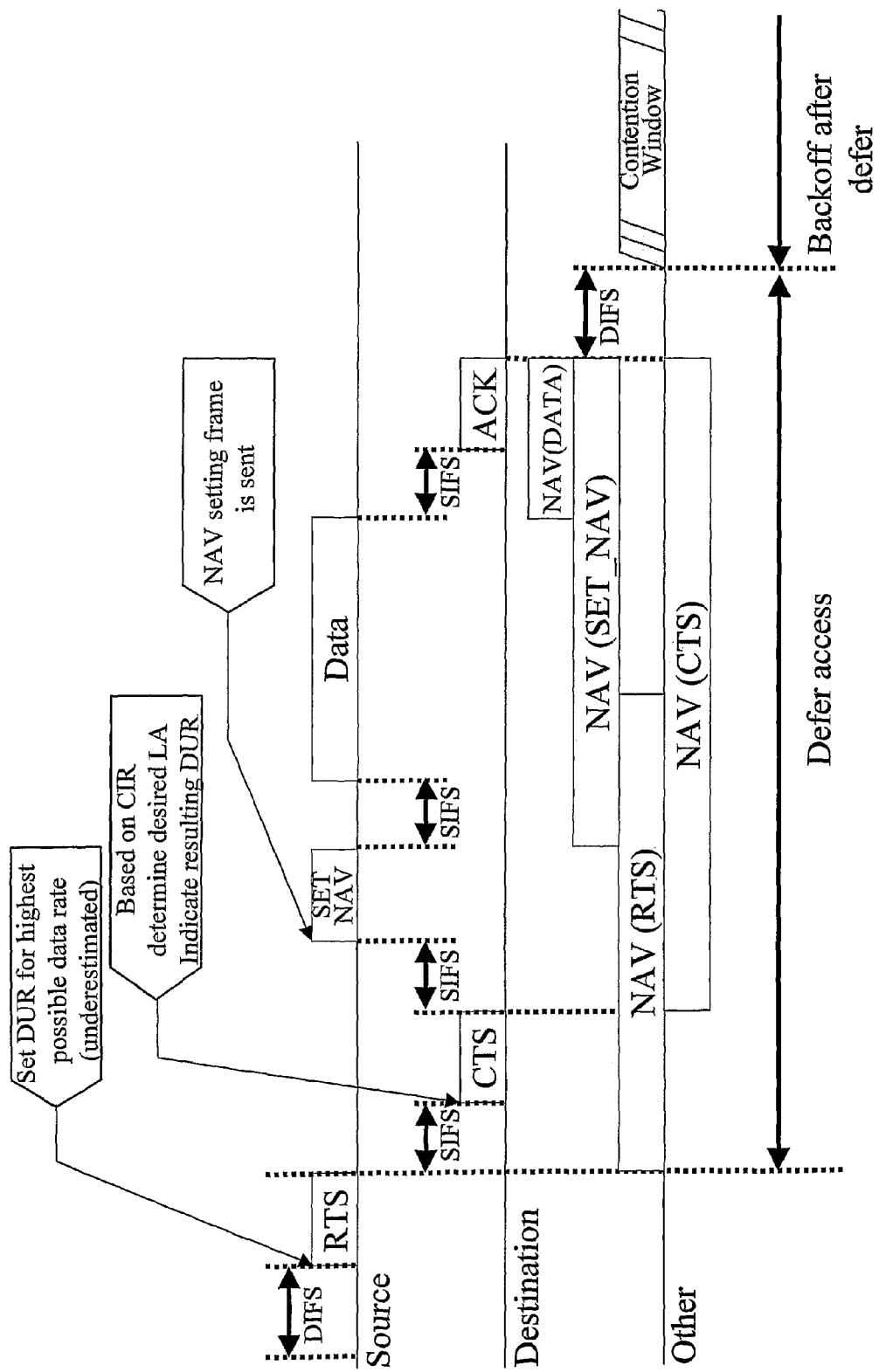
FIG. 10 is a schematic diagram illustrating an exemplary embodiment using a special NAV setting frame.

In yet another embodiment, as illustrated in the schematic diagram of FIG. 10, a special NAV setting frame is introduced on the transmitting side (source node) before data transmission. This NAV setting frame includes a duration field indicating the updated transmit duration. Various options on how to set the NAV around the source node exist. Any type of frame, preferably being as short as possible, and not disturbing any other station may be sent. As an example one may use an "ACK frame" similar to what is done in setting the NAV when fragments are sent. An alternative is to assemble a "dummy control frame" defined as a new subtype, without any address fields to give the minimum overhead of merely 8 bytes (2 Frame control+2 Duration+4 FCS). This yields a total overhead corresponding to 6-9 OFDM symbols depending on the signal rate for the NAV setting frame. When the highest link rate is used the NAV setting frame may be omitted.

In the particular example of 802.11, the reason why the duration field is normally set with reference to the highest rate is that 802.11 allows NAV vectors to be extended but generally not reduced. Note however that there are exceptions such as the CF-END frame that in the contention free period can reset the NAV vectors. It is has been discussed in the 802.11 standardization work to incorporate mechanism to reset or alter the NAV vectors. Therefore, it is desirable to be general enough to allow duration field setting with reference to a rate lower than the maximum rate. It may then for example be assumed that a new frame called FORCED_DUR frame is sent in a similar fashion to the special NAV setting frame SET_NAV.

The invention thus incorporates link adaptation signaling in the existing (IEEE 802.11) frame structure. The signaling is furthermore backwards compatible with legacy terminals, since that legacy terminal simply update their NAV vector according to duration field indications signaled by stations compatible with the proposed link adaptation signaling scheme. The invention provides bandwidth efficient signaling as no new fields are needed. The signaling also has the further advantage that it may (if desired) operate instantaneously on a frame by frame basis.

Duration Field Signaling Details

As an example, an exemplary detailed duration field calculation is shown for the embodiment of FIG. 6, assuming the use of IEEE 802.11a. If desired, the calculations can be simplified.

The actual duration, which would have been indicated in the RTS message if the perfect link rate was known, is defined as:

$$DUR_{RTS\_Actual} = Tsym \cdot \left(3 + ceil\left(\frac{Len_{DATA}}{N_{DBPS}}\right) + 3 + ceil\left(\frac{Len_{ACK}}{N_{DBPS}}\right)\right) + C_{RTS},$$

where Tsym is the OFDM symbol duration, $N_{DBPS}$ is the number of uncoded bits per OFDM symbol for a selected link rate, the value 3 represents the physical layer overhead OFDM symbols, ceil(x) is a function that determines the smallest integral value not less than x, and $C_{RTS}$ is a constant that accounts for three SIFS interval and the CTS duration. $Len_{DATA}$ and $Len_{ACK}$ are the amount of data (in bits) sent in the DATA and ACK frame, respectively. For the particular example of the 802.11a MAC protocol, $Len_{DATA}$=22+8·Framebody_length+28·8 and $Len_{ACK}$=22+14·8.

It is assumed that the transmitting node uses the highest possible time resolution to represent the amount of data to be sent. In 802.11a this corresponds to 1 μs. Therefore signaling will be of quarter increments (1 μs) of an OFDM duration (4 μs). The transmitting node preferably selects the highest rate, and determines the duration value to be signaled in the RTS field as follows:

$$DUR_{RTS\_Sign} = 1\,\mu s \cdot \left(ceil\left(\frac{Tsym \cdot Len_{DATA}}{1\,\mu s \cdot N_{DBPS(HR)}}\right) + ceil\left(\frac{Tsym \cdot Len_{ACK}}{1\,\mu s \cdot N_{DBPS(HR)}}\right)\right) + $$
$$(6 + C_{TRC}) \cdot Tsym + C_{RTS},$$

where $N_{DBPS(HR)}$ is the assumed highest rate, and $C_{TRC}$ is a time resolution compensation constant.

From the signaled duration value, and with knowledge of the assumed data rate, the receiving node estimates the length of data as follows:

$$Len_{DATA\,(est)} = \left(DUR_{RTS\_Signalled} - ((6 + C_{TRC}) \cdot Tsym + C_{RTS}) - \right.$$
$$\left.1\,\mu s \cdot ceil\left(\frac{Tsym \cdot Len_{ACK}}{1\,\mu s \cdot N_{DBPS(HR)}}\right)\right) \cdot \frac{N_{DBPS(HR)}}{Tsym}$$

Subsequently, the receiving node determines the duration with the selected link rate as:

$$DUR_{CTS\_Sign} = $$
$$Tsym \cdot \left(3 + ceil\left(\frac{Len_{DATA\,(est)}}{N_{DBPS(SEL)}}\right) + 3 + ceil\left(\frac{Len_{ACK}}{N_{DBPS(SEL)}}\right)\right) + C_{CTS},$$

where $N_{DBPS(SEL)}$ is the selected rate, and $C_{CTS}$ accounts for 2 SIFS periods.

Based on the signaled duration value from the receiving node, the tentative RTS duration value and the assumed data rate, the transmitting node determines the updated link data rate $N_{DBPS(UPDATED)}$ to be used for data transmission.

Fragmentation effects should preferably be considered, in particular for 802.11a as an OFDM symbol can be virtually empty data bits or filled with e.g. 216 bits at 54 Mbps link rate in 802.11a.

Performance Evaluation

Figure 11:
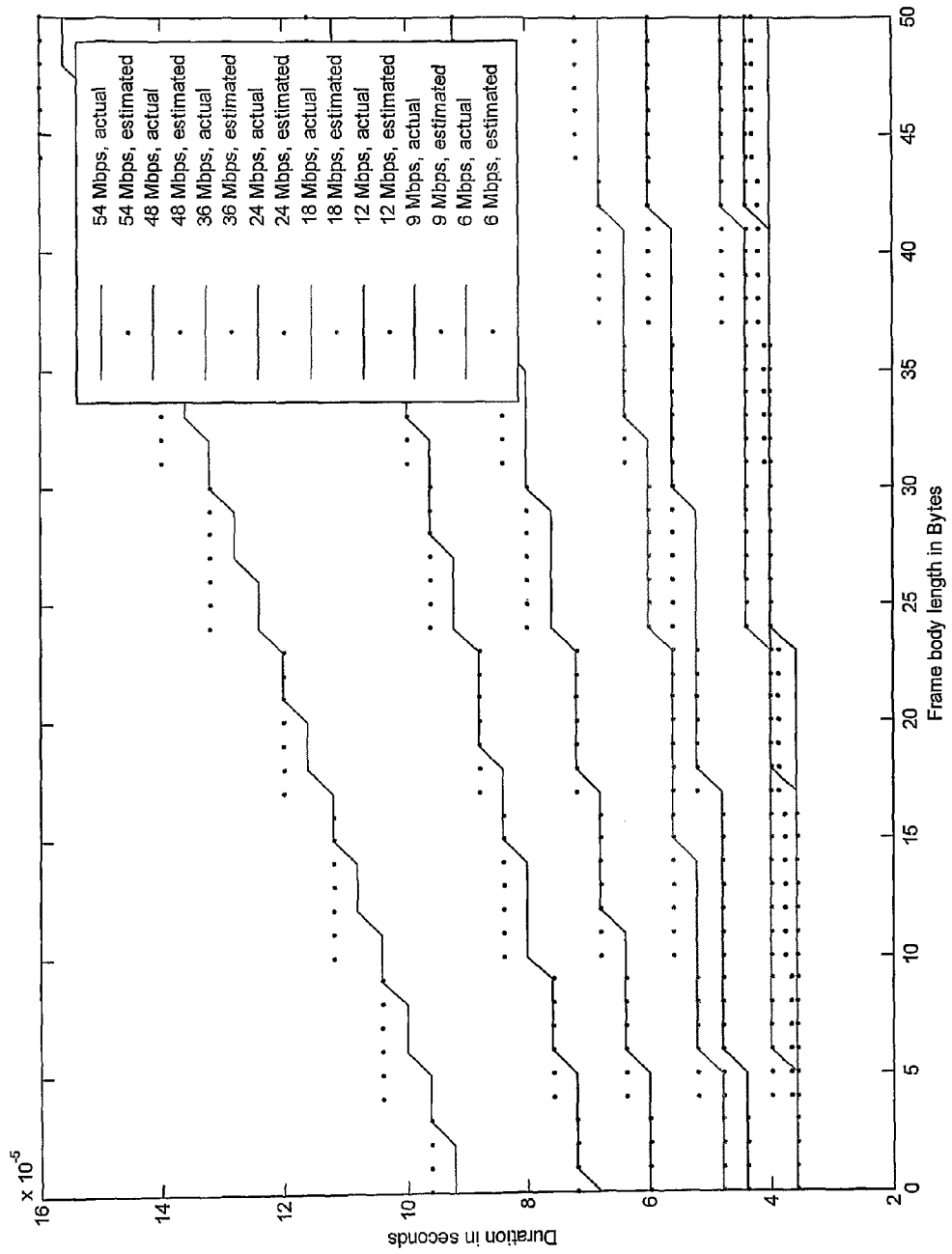
FIG. 11 is a schematic diagram illustrating some performance results according to the invention.

To exemplify the calculations above, FIG. 11 shows with continuous lines the actual duration of various link rates as a function of the frame body length. The dotted lines indicate the estimated duration signaled in the CTS message. For simplicity, the duration intervals for CTS and SIFS have been removed.

It is noted that due to fractional use of the last OFDM symbol in a data transmission in 802.11a, in the invention the transmitting node will hear a duration field that is ¼, ½ or ¾ OFDM symbol longer than actually required. The receiving node on the other hand may, depending on rate, signal up to 1 OFDM symbol duration extra for the high data rate and up to 1-2 OFDM symbols extra duration than required. The net benefit of instantaneous link adaptation justifies such small losses of the channel more than enough.

This effect will not be noted for the single carrier schemes in 802.11b and 802.11 for 1, 2, 5.5 and 11 Mbps modes as the fragmentation effect is negligible.

Extension with Link Rate Memory

Rather than using the highest link rate all the time, an extension to all embodiments is that the originating node uses the last used link rate for duration determination to be sent in the RTS frame. The receiving node is aware of which link rate state that the originating transmitting node occupies from the link rate settings of previous reception of data. Based on the (known) link rate assumption for the RTS duration indication, the receiving node performs the same calculation as before. If time between successive transmissions exceeds a predetermined value, both the originating transmitting node and the receiving node reset the assumed link rate, preferably to a predetermined value. The objective with this extension is to ensure that the indicated duration in the RTS frame agrees better with the actual duration that is used.

Implementation Aspects

Figure 12:
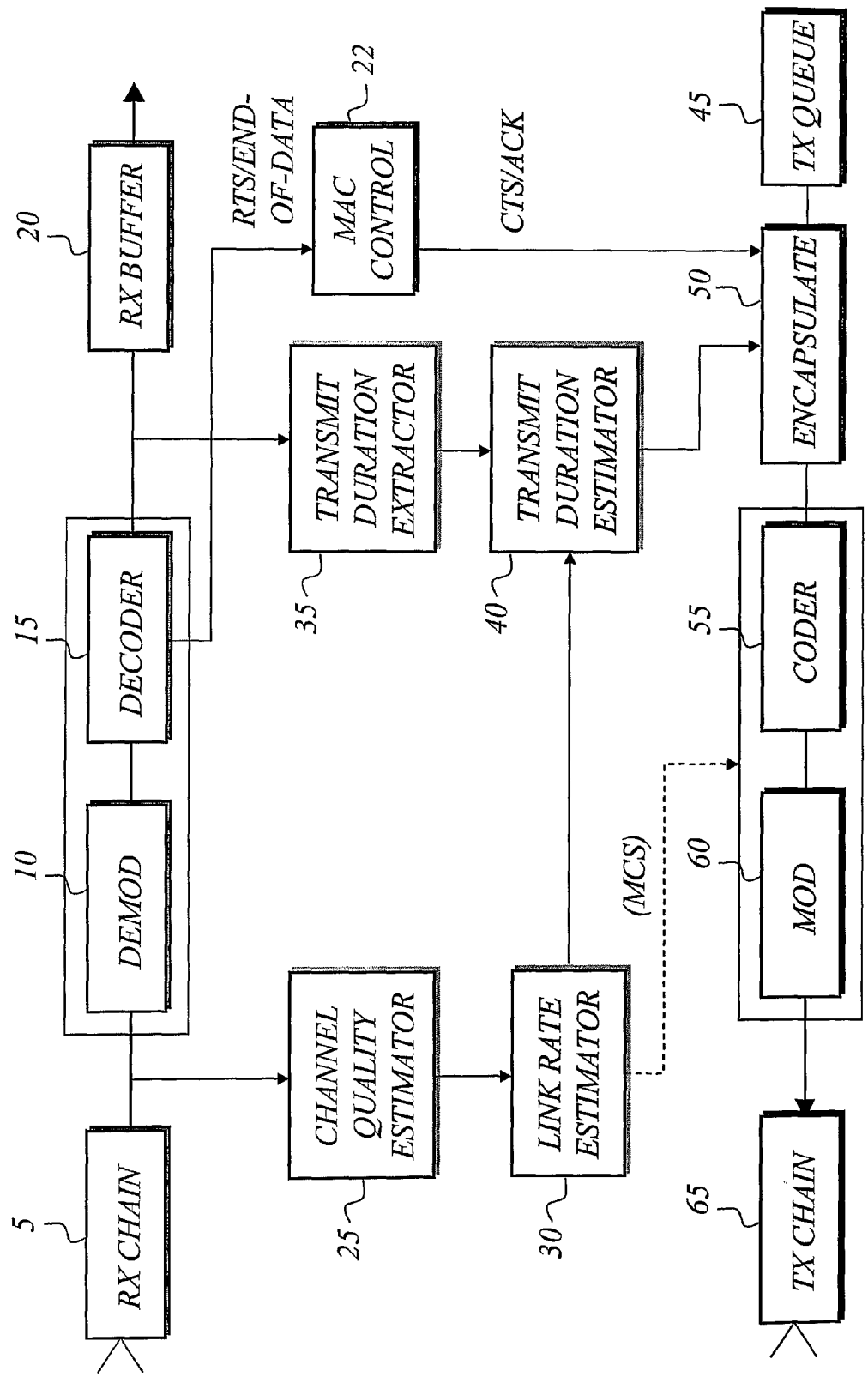
FIG. 12 is a schematic block diagram illustrating the receiver side according to an exemplary embodiment of the invention.

FIG. 12 is a schematic block diagram illustrating the receiver side according to an exemplary embodiment of the invention. The receiving node basically comprises a conventional receiver chain 5 connected to an antenna system, a demodulator 10, a decoder 15, a receive buffer 20, a MAC control module 22, a channel quality estimator 25, a link rate estimator 30, a transmit duration extractor 35, a transmit duration estimator 40, a transmit queue 45, an encapsulation unit 50, a coder 55, a modulator 60 and a conventional transmission chain 65. The MAC control module 22 handles medium access related processing and signaling, and among other things identifies the need for generating a CTS message in response to an RTS message, and the need for generating an ACK message in response to an END-OF-DATA indication. In response to a message, such as an RTS message or a data fragment message from an originating transmitting node, the channel quality estimator 25 provides an estimate (e.g. CIR) of the channel quality. Based on this channel quality estimate, the link rate estimator 30 determines a desired link rate for subsequent data communication from the transmitting side. The transmit duration extractor 35 preferably interprets the duration field in the received message (such as the RTS or data fragment message) and thereby obtains information on the currently indicated transmit duration. The transmit duration estimator 40 determines an updated transmit duration according to the desired link rate by using information on the current transmit duration from the transmit duration extractor 35 and information on the desired link rate from the link rate estimator 30. The transmit duration is subsequently indicated in a duration field of a message, such as a CTS message or an ACK message, intended for the originating node. The corresponding message frame is normally generated in the encapsulation unit 50, which performs encapsulation and addressing. Next, the information is transferred to the coder 55 and modulator 60 for coding and modulation according to an appropriate modulation and coding scheme (MCS). In 802.11, the link rate for transmission from the receiving side is normally set by the link rate of the received message. For example, the CTS link rate is normally set by the RTS rate, and the ACK link rate is normally set by the data link rate. Alternatively, the modulation and coding scheme for transmission from the receiving side may optionally be set according to the data link rate determined by the link rate estimator 30, as indicated by the dotted line from the link rate estimator 30 to the coder 55 and modulator 60.

Figure 13:
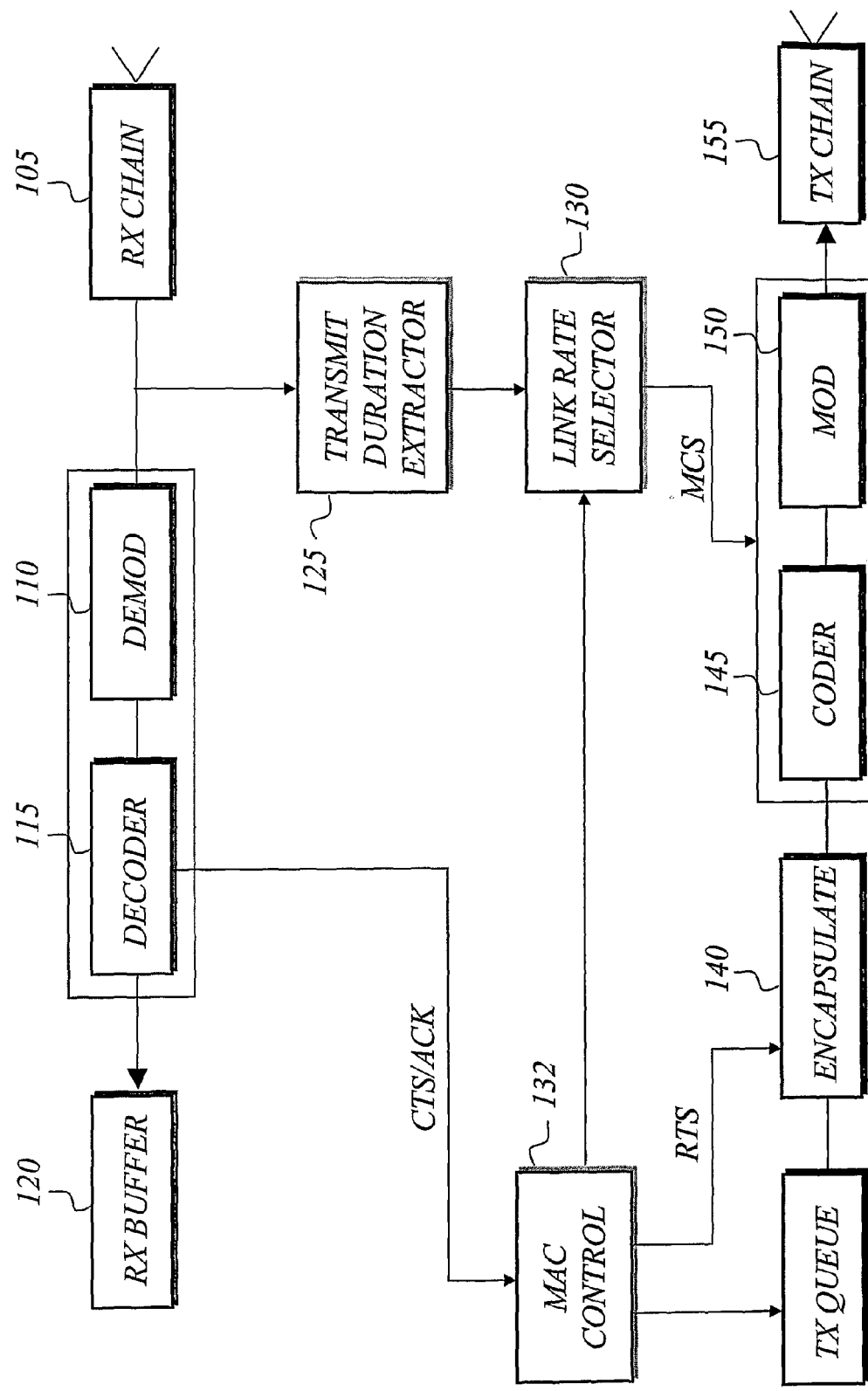
FIG. 13 is a schematic block diagram illustrating the transmitter side according to an exemplary embodiment of the invention.

FIG. 13 is a schematic block diagram illustrating the transmitter side according to an exemplary embodiment of the invention. The transmitting node basically comprises a conventional receiver chain 105 connected to an antenna system, a demodulator 110, a decoder 115, a receive buffer 120, a transmit duration extractor 125, a link rate selector 130, a MAC control unit 132, a transmit queue 135, an encapsulation unit 140, a coder 145, a modulator 150 and a conventional transmission chain 155. Initially, the transmitting node may send an initial message such as an RTS message including an indication of a tentative or current transmit duration to the receiving node. The link rate selector 130 preferably commands the use of a modulation and coding scheme (MCS) for transmission of the RTS message in accordance with a currently assumed tentative link rate. Information on the tentative link rate may, for example, be acquired from the MAC control module 132. Alternatively, the MAC control module directly selects the initial MCS to be used. In response to for example a CTS message or an ACK message including an indication of an updated transmit duration from the receiving node, the transmit duration extractor 125 interprets the duration field in the received message and thereby obtains information on the updated transmit duration. The link rate selector 130 determines an updated data link rate in response to the updated transmit duration (and a priori known information of data packet length and possibly also detailed medium access protocol related parameters, or the previously indicated tentative rate and duration) and selects a suitable modulation and coding scheme (MCS) to be used for transmission of data to the receiving node. The MAC control module 132 handles medium access related processing and signaling, and among other things handles RTS and DATA signaling, and provides information on data packet length and possibly also detailed medium access protocol related parameters to the link rate selector 130. For example, the MAC control module 132 may trigger the signaling of an RTS message including an indication of a tentative transmit duration in the duration field. The MAC control module 132 may also initiate data transmission in response to a CTS message. Data messages are generated by selecting data from the transmit queue 135, for example under the control of the MAC control module 132, and transferring the data to the encapsulation unit 140, which performs encapsulation and addressing. The duration corresponding to the updated link rate is indicated in the duration field of the data frame. The coder 145 and modulator 150 perform coding and modulation according to the selected link mode (MCS) and the transmission chain 155 finally transmits the data frame to the receiving node.

The embodiments described above are merely given as examples, and it should be understood that the present invention is not limited thereto. Further modifications, changes and improvements that retain the basic underlying principles disclosed and claimed herein are within the scope of the invention.

The invention claimed is:

1. A method for supporting link adaptation in a wireless network comprising at least two nodes, said method comprising the steps of:

a designated originating node sending a first message, including an indication of a current transmit duration for transfer of a predetermined amount of information, to at least a designated receiving node, wherein said current transmit duration corresponds to a currently assumed data link rate;

said designated receiving node selecting a desired data link rate for subsequent communication from said designated originating node;

said designated receiving node determining an updated transmit duration according to said desired data link rate;

said designated receiving node sending a second message, including an indication of said updated transmit duration, to at least said designated originating node; and said designated originating node determining an updated data link rate in response to said updated transmit duration.

2. The method of claim 1, further comprising the step of said designated originating node performing link adaptation in accordance with said updated data link rate.

3. The method of claim 2, further comprising the step of said designated originating node sending data to said designated receiving node with said updated data link rate and indicating the transmit duration corresponding to the updated data link rate.

4. The method of claim 1, wherein said updated transmit duration is determined based on said current transmit duration indicated in said first message, said currently assumed link rate known by both said designated originating node and said designated receiving node, and said desired link rate selected by said receiving node.

5. The method of claim 4, wherein said step of determining an updated transmit duration comprises the steps of:
   determining an expected amount of information to be received based on the currently assumed data link rate and the current transmit duration; and
   determining said updated transmit duration based on the determined amount of information and the desired data link rate selected by the receiving node.

6. The method of claim 5, wherein said step of determining an expected amount of information to be received and said step of determining said updated transmit duration both consider MAC (Medium Access Control) protocol information.

7. The method of claim 1, wherein said first message is an RTS (Request To Send) message, and said second message is a CTS (Clear To Send) message.

8. The method of claim 1, wherein said first message is a data fragment message, and said second message is a data acknowledgment message.

9. The method of claim 1, wherein transmit duration is indicated in a transmit duration field in each respective message.

10. The method of claim 1, wherein said wireless network operates based on a contention-based medium access protocol with transfer of transmit duration information for virtual carrier sensing.

11. The method of claim 1, wherein said wireless network is an IEEE 802.11 type of network.

12. The method of claim 1, wherein said currently assumed data link rate is determined based on at least one previous indication of transmit duration from said designated receiving node provided that said at least one previous indication occurred within a predetermined period of time.

13. The method of claim 1, wherein said step of selecting a desired data link rate comprises the step of said receiving node determining said desired data link rate based on reception characteristics when communicating with said designated originating node.

14. The method of claim 1, wherein said updated data link rate is determined based on said updated transmit duration and said predetermined amount of information to be transferred.

15. A system for supporting link adaptation in a wireless network comprising at least two nodes, said system comprising:
   means for sending a first message, including an indication of a current transmit duration for transfer of a predetermined amount of information, from a designated originating node to at least a designated receiving node wherein said current transmit duration corresponds to a currently assumed data link rate;
   means for determining, in said designated receiving node, a desired data link rate for subsequent communication from said designated originating node;
   means for determining, in said designated receiving node, an updated transmit duration according to said desired link rate;
   means for sending a second message, including an indication of said updated transmit duration, from said designated receiving node to at least said designated originating node; and
   means for determining, in said designated originating node, an updated data link rate in response to said updated transmit duration.

16. The system of claim 15, further comprising means for performing, in said designated originating node, link adaptation in accordance with said updated data link rate.

17. The system of claim 16, further comprising means for sending data with said updated data link rate from said designated originating node to said designated receiving node and indicating the transmit duration corresponding to the updated data link rate.

18. The system of claim 15, wherein said determining means is operable for determining an updated transmit duration based on said current transmit duration indicated in said first message, said currently assumed link rate known by both said designated originating node and said designated receiving node, and said desired data link rate selected by said receiving node.

19. The system of claim 18, wherein said means for determining an updated transmit duration comprises:
   means for determining an expected amount of information to be received based on the currently assumed data link rate and the current transmit duration; and
   means for estimating said updated transmit duration based on the determined amount of information and the desired data link rate selected by the receiving node.

20. The system of claim 19, wherein said means for determining an expected amount of information to be received and said means for determining said updated transmit duration both operate based on MAC (Medium Access Control) protocol information.

21. The system of claim 15, wherein said first message is an RTS (Request To Send) message, and said second message is a CTS (Clear To Send) message.

22. The system of claim 15, wherein said first message is a data fragment message, and said second message is a data acknowledgment message.

23. The system of claim 15, wherein transmit duration is indicated in a transmit duration field in each respective message.

24. The system of claim 15, wherein said wireless network operates based on a contention-based medium access protocol with transfer of transmit duration information for virtual carrier sensing.

25. The system of claim 15, wherein said wireless network is an IEEE 802.11 type of network.

26. The system of claim 15, further comprising means for determining said currently assumed data link rate based on at least one previous indication of transmit duration from said designated receiving node provided that said at least one previous indication occurred within a predetermined period of time.

27. The system of claim 15, wherein said means for determining a desired data link rate comprises means for determining, in said designated receiving node, said desired data link rate based on reception characteristics when communicating with said designated originating node.

28. The system of claim 15, wherein said means for determining an updated data link rate is operable for determining said updated link rate based on said updated transmit duration and said predetermined amount of information to be transferred.

29. A receiving node in a wireless network, said receiving node comprising:
- means for determining an updated transmit duration, for transfer of a predetermined amount of information from a designated transmitting node, at least partly based on a current transmit duration initially signaled from said transmitting node and a desired data link rate selected by said receiving node, wherein said current transmit duration corresponds to a currently assumed link rate;
- means for signaling an indication of said updated transmit duration to at least said transmitting node for enabling said transmitting node to adapt the data link rate, to be used for sending data to said receiving node, in response to said updated transmit duration.

30. A transmitting node in a wireless network, said transmitting node comprising:
- means for signaling an indication of a current transmit duration, for transfer of a predetermined amount of information, to at least a designated receiving node, wherein said current transmit duration corresponds to a currently assumed data link rate;
- means for receiving an indication of an updated transmit duration from said designated receiving node, said updated transmit duration being determined by said receiving node at least partly based on a desired data link rate for subsequent communication from said transmitting node, said currently assumed link rate and said signaled current transmit duration; and
- means for adapting the data link rate, to be used for sending data to said receiving node, in response to said updated transmit duration.

31. A system for supporting link adaptation in a wireless network comprising at least two nodes, said system comprising:
- a first transmitting module for sending a first message, including an indication of a current transmit duration for transfer of a predetermined amount of information, from a designated originating node to at least a designated receiving node wherein said current transmit duration corresponds to a currently assumed data link rate;
- a first link rate estimator for determining, in said designated receiving node, a desired data link rate for subsequent communication from said designated originating node;
- a transmit duration estimator for determining, in said designated receiving node, an updated transmit duration according to said desired link rate;
- a second transmitting module for sending a second message, including an indication of said updated transmit duration, from said designated receiving node to at least said designated originating node; and
- a second link rate estimator for determining, in said designated originating node, an updated data link rate in response to said updated transmit duration.

* * * * *